July 8, 1969

C. BRECHER ET AL 3,454,901

OPTICAL MASER SOLUTION COMPRISING A COMPOUND OF
EUROPIUM TETRAKIS BENZOYLTRIFLUOROACETONATE
AND PIPERIDINIUM

Filed July 19, 1965

INVENTORS.
CHARLES BRECHER
ALEXANDER LEMPICKI
HAROLD SAMELSON

BY R. J. Frank
ATTORNEY.

3,454,901
OPTICAL MASER SOLUTION COMPRISING A COMPOUND OF EUROPIUM TETRAKIS BENZOYL-TRIFLUOROACETONATE AND PIPERIDINIUM
Charles Brecher, Flushing, Alexander Lempicki, New Hyde Park, and Harold Samelson, New York, N.Y., assignors to General Telephone and Electronics Laboratories, Inc., a corporation of Delaware
Filed July 19, 1965, Ser. No. 473,034
Int. Cl. H01s 3/04, 3/20
U.S. Cl. 331—94.5   3 Claims

ABSTRACT OF THE DISCLOSURE

An optical maser containing a solution having the empirical formula $M^+Eu(BTF)_4^-$ where $M^+$ is a cation which renders the compounds soluble in aliphatic nitriles and $Eu(BTF)_4^-$ is the anion europium tetrakis benzoyltrifluoroacetonate. In a preferred form the cation $M^+$ is piperidinium.

---

This invention relates to optical masers and in particular to a maser in which stimulated emission is obtained at room temperatures.

The term "maser" is an acronym for "microwave amplification by stimulated emission of radiation" and an optical maser, or laser, is a maser designed for producing stimulated emission of radiation" and an optical maser, or laser, is a maser designed for producing stimulated radiation at a frequency falling within the range of light frequencies. Light frequencies are defined as those frequencies falling within the band including the infrared and ultraviolet or between $2 \times 10^6$ angstroms and 100 angstroms.

The operation of maser devices depends upon the interaction of radiation and matter. More particularly, according to present theory, radiation consists of an accumulation of photons, each of which has a quantity of energy associated with it. This accumulation of photons constitutes an electromagnetic wave. When all photons have the same energy, the wave will have one frequency uniquely determined by the photon energy. When the photons have different energies, the wave will contain a plurality of wave components of different frequencies, these frequencies corresponding to the various photon energies.

Interaction of radiation with matter ensues when matter (i.e. atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts within an incident photon, the atom can absorb the energy of the photon and be placed in a higher or "excited" state, provided that the energy of the photon is at least equal to the difference in energy of the ground and excited states. Similarly, when the energy level of an atom is suddenly changed from one state to a lower energy state, a photon of radiation may be produced. The energy of this photon will be equal to the difference in energy between these states.

An atom in an excited state can emit a photon spontaneously and revert to its ground state or to some intermediate state. However, during the period in which the atom is still excited, it can be stimulated to emit a photon by interacting with an incident photon if the energy of this photon is equal to that of the photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher states. In the maser, the distribution of electrons among the energy levels is changed by a process of "pumping" so that there will be more atoms in the higher than in the lower states. (The process of pumping consists of injecting electromagnetic energy into the assemblage of atoms to raise the atoms into excited states.) The incident photons of the lowest energy can produce more downward than upward transitions and stimulated emission can be produced.

In the maser, a suitable active material is enclosed in a cavity resonator having at least two separated reflecting walls. A wave starting out anywhere between the walls of the chamber will grow in amplitude until the wave reaches either wall where it will be reflected back into the medium. Inevitably there are losses due to imperfect reflections, absorption and scattering. However, if the amplification by stimulated emission is large enough to compensate for these losses, a steady wave can build up in the resonator.

A wave that starts at any position between the reflecting ends of the resonator will travel toward one end with increasing amplitude. When it reaches the end, the wave is reflected back toward the starting point with further increase in amplitude. The gain in energy of the wave during repeated passages compensates for losses at the reflecting surfaces and elsewhere and a steady wave will build up. Each time the wave is reflected at an end, a very small portion of the wave passes through this end, this portion is continually reinforced because of repeated reflections and, thus, reinforced, constitutes the maser output wave.

The output of the maser is highly directional since the waves which are emitted must make many repeated passages without deviating very much from a path along the axis of the resonator. (If a wave is inclined at an angle with respect to this path, it will leave the resonator after few if any repeated reflections and will not have the opportunity to grow appreciably in amplitude.) The output waves are monochromatic (i.e. have essentially a single frequency) since stimulated emission takes place most strongly at frequencies in the middle of the band of frequencies emitted by spontaneous radiation. The initial stimulated emission at these frequencies will cause further emission at the same frequencies so that the output waves will contain only an extremely narrow range of frequencies or wavelengths.

In copending applications Ser. No. 276,942 filed Apr. 30, 1963 (now abandoned), and Ser. No. 407,961 filed Nov. 2, 1964, both assigned to the same assignee as the present application, there are disclosed optical masers in which stimulted emission is obtained by exciting solutions containing rare earth chelates. Since the active media in these masers are liquids, they may be easily replaced or modified. This is in contrast to optical masers of the type employing a solid crystalline body such as a cylindrical chromium doped ruby having partially silvered optically flat end surfaces.

The optical maser disclosed in the aforementioned abandoned application Ser. No. 276,942 employs an alcohol solution containing a rare-earth chelate, europium benzoylacetonate. This material produces stimulated emission in the temperature range $-120°$ to $-170°$ C. and therefore must be cooled before lasing action can be obtained. Cooling to within the temperature range $-120°$ to $-170°$ C. must also be provided for the optical master described in application Ser. No. 407,961 wherein the anion europium tetrakis dibenzoylymethide in a solvent of alcohol and dimethylformamide is employed as the active medium.

Cooling of the active material may be accomplished by circulating precooled nitrogen in the region surrounding the cavity containing the active medium. However, operation at room temperature is highly desirable and it is therefore an object of our invention to provide an optical maser which may be operated at temperatures as high as +30° C.

It is a further object of the invention to provide an active material in which stimulated emission may be obtained at temperatures in excess of −40° C.

In the present invention an optical maser is provided in which a cavity having spaced apart reflecting surfaces is filled with a solution of a compound having the empirical formula $M^+Eu(TF)_4^-$, where $M^+$ is a cation which renders the compound soluble in aliphatic nitriles and $Eu(BTF)_4^-$ is the anion europieum tetrakis benzoyltrifluoroacetonate. Preferably the cation is an organic base such as piperidinium ($P^+$), imidazolium, pyrrolidinium, tetramethylammonium or pyridinium. The solvent can be any aliphatic nitrile such as acetonitrile, propionitrile, butyronitrile, isobutyronitrile or mixtures thereof.

Stimulated radiation is obtained by a mechanism which is believed to be as follows. When light of the proper wavelength is incident on the solution, energy is absorbed by the ligand benzoyltrifluoroacetone and a transition occurs from the ground state to a higher level (defined as a singlet). The complex $Eu(BTF)_4^-$ then relaxes to a triplet state between the ground and singlet states following which there is a transfer of energy to the rare earth europium ion. Subsequently, there is a decay to an energy level somewhat above the ground level resulting in stimulated radiation in the visible spectrum.

The optical cavity consists essentially of a transparent cylinder having mirror surfaces at each end. The mirror surfaces facing the inside of the cavity are partially transmitting so that a portion of the light striking them will be transmitted while the remainder of the light is reflected. When a cavity of this type is filled with the solution $P^+Eu(BTF)_4^-$ in a solvent of acetonitrile, stimulated emission is obtained at temperatures up to +30° C.

The above objects of and the brief introduction to the present invention will be more fully understood and further objects and advantages will become apparent from a study of the following description in connection with the drawings wherein.

Figure 1:
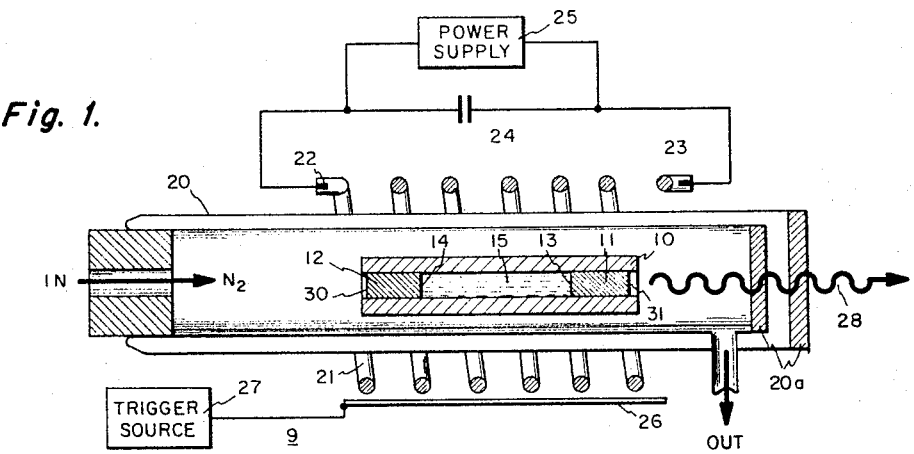
FIG. 1 is a schematic representation of an optical maser employing a liquid active material.

Referring to FIG. 1, there is shown schematically an optical maser 9 comprising a hollow transparent cylinder 10 which may be made of quartz or other optically transparent material having a low temperature coefficient of expansion. By optically transparent it is meant that the walls of cylinder 10 transmit radiation with regligible attenuation at the frequency required to pump the maser. The bore of cylinder 10 is accurately and uniformly ground and first and second quartz pistons 11 and 12 are inserted in the ends of the cylinder forming a very close sliding fit. These pistons are transparent to the radiation emitted by the maser. The inner faces 13 and 14 of pistons 11 and 12 are optically polished to provide high quality spherical surfaces and high dielectric mirrors are evaporated onto these surfaces. The mirror evaporated on to face 13 is approximately 99% reflecting for those wavelengths at which emission is obtained from the device whereas the mirror evaporated on to face 14 is totally reflecting. A more detailed description of this device is disclosed in U.S. Patent 3,319,183 granted May 9, 1967 to A. Lempicki and K. Weise.

The cavity 15 defined by the inside of cylinder 10 and mirrors 13 and 14 is completely filled with a solution of the compound $M^+Eu(BTF)_4^-$ in acetonitrile

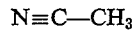

The range of concentration is from $1 \times 10^{-3}$ moles per liter to the limit of solubility of this compound in the solvent. The cation $M^+$ associated with the complex anion europium tetrakis benzoyltrifluoroacetonate may be piperidinium or the cation of a similar organic amine base, such as imidazolium, pyrrolidinium, tetramethylammonium, or pyridinium. Other nitrile solvents such as propionitrile

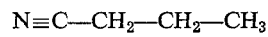

butyronitrile

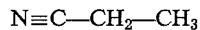

isobutyronitrile

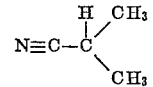

or mixtures thereof may be employed.

Figure 2:
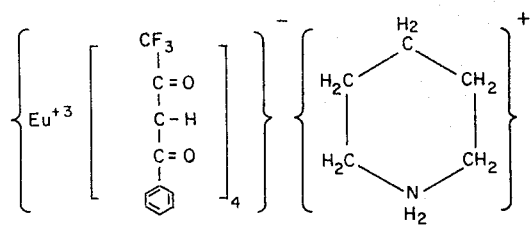
FIG. 2 shows the structural formula for the compound $M^+Eu(BTF)_4^-$.

The structure of the compound is given in FIG. 2. The complex anion $Eu(BTF)_4^-$ is a chelate of trivalent europium with the four enolate ions of benzoyltrifluoroacetone

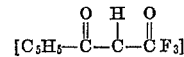

The complete complex has a single negative charge which is compensated by piperidinium $C_5H_{12}N$ in the case shown but one of the other aforementioned organic base cations may also be used.

The compound $P^+Eu(BTF)_4^-$ may be synthesized using a method described at pages 10 et seq. in the book, "Inorganic Synthesis," vol. II, by W. C. Fernelius, published by McGraw-Hill Book Co., Inc., New York, 1946. In accordance with this method, a solution of benzoyltrifluoroacetone in 95% ethanol is made, the amount of benzoyltrifluoroacetone being that required to produce the stated compound with europium. A stoichiometric amount of piperidine is then added to the benzoyltrifluoroacetone solution. Following this, a solution of europium chloride ($EuCl_3 \cdot 6H_2O$) in 95% ethanol is slowly stirred into the original solution. The volume of the resulting solution is reduced until a sufficient precipitate is formed. The precipitate is filtered off, washed several times with 95% ethanol, and then air dried.

The cylinder 10 is placed within a hollow-walled tube 20, such as a Dewar flask having quartz window 20a at one end, and a helical high-intensity xenon flash lamp 21 placed around the tube. The hollow wall of tube 20 is evacuated. Electrodes 22 and 23 are connected to the ends of the helical flash tube 21 and a capacitor 24 coupled between the terminals. A power supply 25 maintains a constant voltage of about 10 kilovolts across capacitor 24.

The cylinder 10 is maintained at a temperature in the range −40° C. to +30° C. Precooled nitrogen gas may be circulated through the tube 20 to obtain temperatures below about +20° C. but this is not necessary above this temperature. The cell design provides an optical cavity having a Q of about $10^6$.

When the xenon lamp is flashed by applying a 20–30 kilvolt trigger pulse to wire 26 from trigger source 27, energy is absorbed by the solution and, by the mechanism discussed previously, stimulated radiation is obtained through piston 11 as indicated by arrow 28. Alternatively, both of the pistons may be partially transparent and the output will be obtianed from both ends of the device. The wavelength of the absorbed radiation is in the approximate range 3500 to 4500 angstroms. Stimulated radiation has been obtained at a wavelength of approximately 6119 angstroms.

Figure 3A:
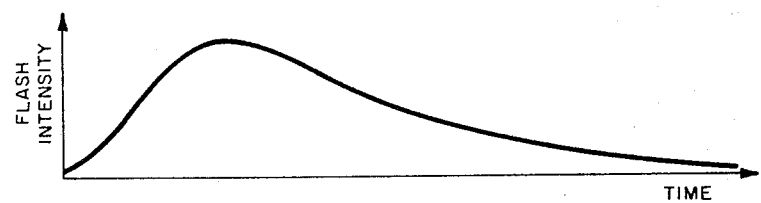
FIGS. 3a and 3b are idealized drawings of oscillograms illustrating the flash intensity and output of the optical maser.
Figure 3B:

FIGS. 3a and 3b show oscillograms of the radiation obtained from the output of a photomultiplier when the optical maser was stimulated by a flash from a xenon lamp having a duration of one millisecond and an energy input of 3000 joules. The bore of the quartz cylinder 10 has a diameter of 1.5 millimeters and the radius of curvature of the mirrors is about 5 centimeters. The solution consisted of acetonitrile and P+Eu(BTF)$_4^-$ the latter having a concentration of approximately $5.2 \times 10^{18}$ molecules per cubic centimeter.

The flash intensity is shown plotted against time in FIG. 3a and the fluorescence intensity of the light emitted is shown in FIG. 3b. The relaxation oscillations shown in FIG. 3b are characteristic of the operation obtained with optical masers. Stimulated emission was obtained at a temperature of 30° C. In other experiments, emission was found at temperatures down to the freezing point of acetonitrile (approximately −40° C.).

Figure 4:
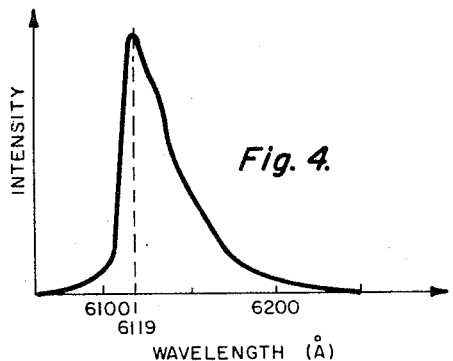
FIG. 4 shows the idealized spectral distribution of radiation emitted by the maser.

FIG. 4 shows the spectral distribution of radiation from the solution. The horizontal axis corresponds to a wavelength scale in angstrom and the vertical scale to radiation intensity in arbitrary units.

A solution of the compound P+Eu(BTF)$_4^-$ was also prepared using a solvent consisting of a mixture of one part propionitrile, one part butyronitrile and one part isobutyronitrile. When placed in the cavity of FIG. 1, stimulated emission was obtained at temperatures in the range −70° to 0° C.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A composition of matter consisting essentially of a solution of a compound having the empirical formula

M+Eu(BTF)$_4^-$ where Eu(BTF)$_4^-$ is the anion europium tetrakis benzoyltrifluoroacetonate and M+ is the cation piperidinium, said compound being dissolved in a solvent consisting essentially of propionitrile, butyronitrile and isobutyronitrile in the ratio 1:1:1.

2. An optical maser comprising
  (a) a cavity having movable spaced apart reflecting surfaces at opposite ends thereof,
  (b) a solution of a compound having the empirical formula M+Eu(BITF)$_4^-$ located within said cavity, Eu(BFT)$_4^-$ in said formula representing the anion europium tetrakis benzoyltrifluoroacetonate and M+ representing the cation piperidinium, said compound being dissolved in a solvent consisting essentially of acetonitrile, said optical maser producing stimulated emission when the temperature of said solution is as high as +30° C., and
  (c) light emitting means surrounding said transparent cavity, said solution emitting stimulated radiation when radiated by light from said light emitting means.

3. The optical maser defined by claim 2, wherein the concentration of the compound M+Eu(BFT)$_4^-$ in the solution is approximately $5.2 \times 10^{18}$ molecules per cubic centimeter.

References Cited

UNITED STATES PATENTS

| | | | |
|---|---|---|---|
| 3,319,183 | 5/1967 | Lempicki et al. | 331—94.5 |
| 3,360,478 | 12/1967 | Schimitschek et al. | 331—94.5 |

OTHER REFERENCES

Schimitschek et al: Stimulated Emission in an Europium Chelate Solution at Room Temperature, J. Appl. Phys., vol. 36, No. 3, part I (March 1965), pp. 867 and 868.

JEWELL H. PEDERSEN, *Primary Examiner.*

W. L. SIKES, *Assistant Examiner.*

U.S. Cl. X.R.

252—301.2